United States Patent
Kushnick

[15] 3,643,971
[45] Feb. 22, 1972

[54] SELF-INFLATING IMPACT-ABSORBING BAG FOR VEHICLES

[72] Inventor: Julian H. Kushnick, Brooklyn, N.Y.

[73] Assignee: Allied Chemical Corporation, New York, N.Y.

[22] Filed: Aug. 11, 1970

[21] Appl. No.: 63,196

[52] U.S. Cl. ........................................280/150 AB, 220/47
[51] Int. Cl. ................................................B60r 21/10
[58] Field of Search..................280/150 AB, 150 B; 180/90; 200/31 SR, 47, 36; 23/281; 9/316, 11 A; 141/4, 1, 19

[56] References Cited

UNITED STATES PATENTS

| | | | |
|---|---|---|---|
| 2,991,629 | 7/1961 | Rose | 222/394 X |
| 3,231,152 | 1/1966 | McKiever | 222/394 |
| 3,309,109 | 3/1967 | Baughman | 220/47 |
| 3,425,712 | 2/1969 | Berryman | 280/150 AB |
| 3,430,979 | 3/1969 | Terry et al. | 9/11 A |
| 3,450,414 | 6/1969 | Kobori | 280/150 AB |

FOREIGN PATENTS OR APPLICATIONS 896,312  11/1953  Germany.........................280/150 AB Primary Examiner—Kenneth H. Betts
Attorney—Jonathan Plaut

[57] ABSTRACT

A vehicle safety device having normally contracted protective bags installed in a vehicle at convenient locations and which is adapted so that upon the occurrence of a collision of the vehicle a noninflammable gas generating medium produces and delivers a gas into the protective bags to inflate them, thus providing shock-absorbing cushions between passengers or other objects and rigid vehicle parts.

13 Claims, 2 Drawing Figures

INVENTOR
JULIAN H. KUSHNICK
BY
ATTORNEY

SELF-INFLATING IMPACT-ABSORBING BAG FOR VEHICLES

Inflatable confinements for controlling movement of an occupant of a vehicle during a collision are well known. Such a confinement is disclosed in U.S. Pat. No. 3,450,414, for example. Briefly stated, the inflatable confinements of the prior art generally include a flexible protective bag connected to a gas supply which is activated to direct a high-pressure gas to the bag in response to the functioning of an impact-detecting unit. However, such systems, which are generally intended for, but are not limited to, use in motor vehicles, have been known to possess certain practical disadvantages in providing an impact-absorbing device for the passengers. For example, they require a separate high-pressure storage container for the high-pressure gas supply and special valves to direct the high-pressure gas to the protective bag. In addition, when it is desired to locate a protective bag separate and apart from the high-pressure gas source, special piping is required to direct the gas under pressure to the protective bags. It is also preferable to eliminate or minimize the use of seams in the bags to reduce hardened areas in the bag and construction costs.

Briefly stated, the present invention resides in the provision of a safety device having normally deflated bags installed in a vehicle at convenient locations where they may provide maximum protection to the passengers, as for example in the instrument panel of a motor vehicle. In one embodiment, the bags are enclosed in an elongated pressure-resistant enclosure having a rectangular cross section. The enclosure has hinged covers which may be held closed for example, by impact sensitive latches which may be programmed to open automatically through a suitable impact-sensing device upon impact of the vehicle or upon an excessive deceleration thereof. For example, in an automobile, the impact-sensing device may be located on or near the vehicle bumper so that on impact a signal results in the opening of the latches of the enclosure covers. The bags, which are normally contained within the enclosure in a folded condition, are filled with a medium capable of generating a gas for example, when the latches are released and the hinged covers are permitted to open. Thus when the covers open and the pressure caused by the closed enclosure and folded bag on the gas generating medium is relieved, the gas generating material supplies a gas into the protective bags which it already occupies and each bag is expanded as it is filled with the gas. As an alternative to released pressure or where the gas generating medium does not supply a gaseous mixture to the bag with sufficient speed, heat sources or other suitable sources of energy may be included within the enclosure whereby the energy source may enhance the formation of the gaseous medium as it is directed into and expands the bag. Such energy sources may for example, be actuated to provide energy to the gas generating medium by the same signal which is utilized to release the housing cover latches.

When a signal is generated by the impact sensing device and directed to the latches of the enclosure covers to release them and to activate the energy source, the medium within the folded bags begins to generate a gaseous medium into the bags to expand the bags between the housing and the passengers. The impact sensing device for example, may be programmed to detect vehicle deceleration in g (acceleration due to gravity) of sufficient magnitude to cause physical harm to the passengers and to generate a signal which is transmitted to the housing cover latches and the energy source.

The expansion of the bag when the vehicle undergoes a collision, will provide a restraint to hold the passengers in place.

The present invention utilizes, in one embodiment, a unique flexible inexpensive nylon film to form a seamless resilient bag, which provides inexpensive, maximum cushioning to the passengers against impact and which minimizes the possibility of injury to the passengers.

Consequently it is an object of the present invention to provide a safety device for vehicle passengers with which it is possible to protect the lives of the passengers in the event of a crash.

It is still another object of this invention to provide a safety device for vehicle passengers embodying a deflated bag in an enclosure in which a gas-producing medium is contained and which enclosure has doors which automatically open upon impact of the vehicle or upon excessive deceleration thereof.

A still further object of this invention is to provide a safety device for vehicle passengers embodying a seamless, nylon film bag.

Other objects, features and advantages of this invention will become apparent from the following description taken in conjunction with the accompanying drawings in which.

Figures 1, 2:
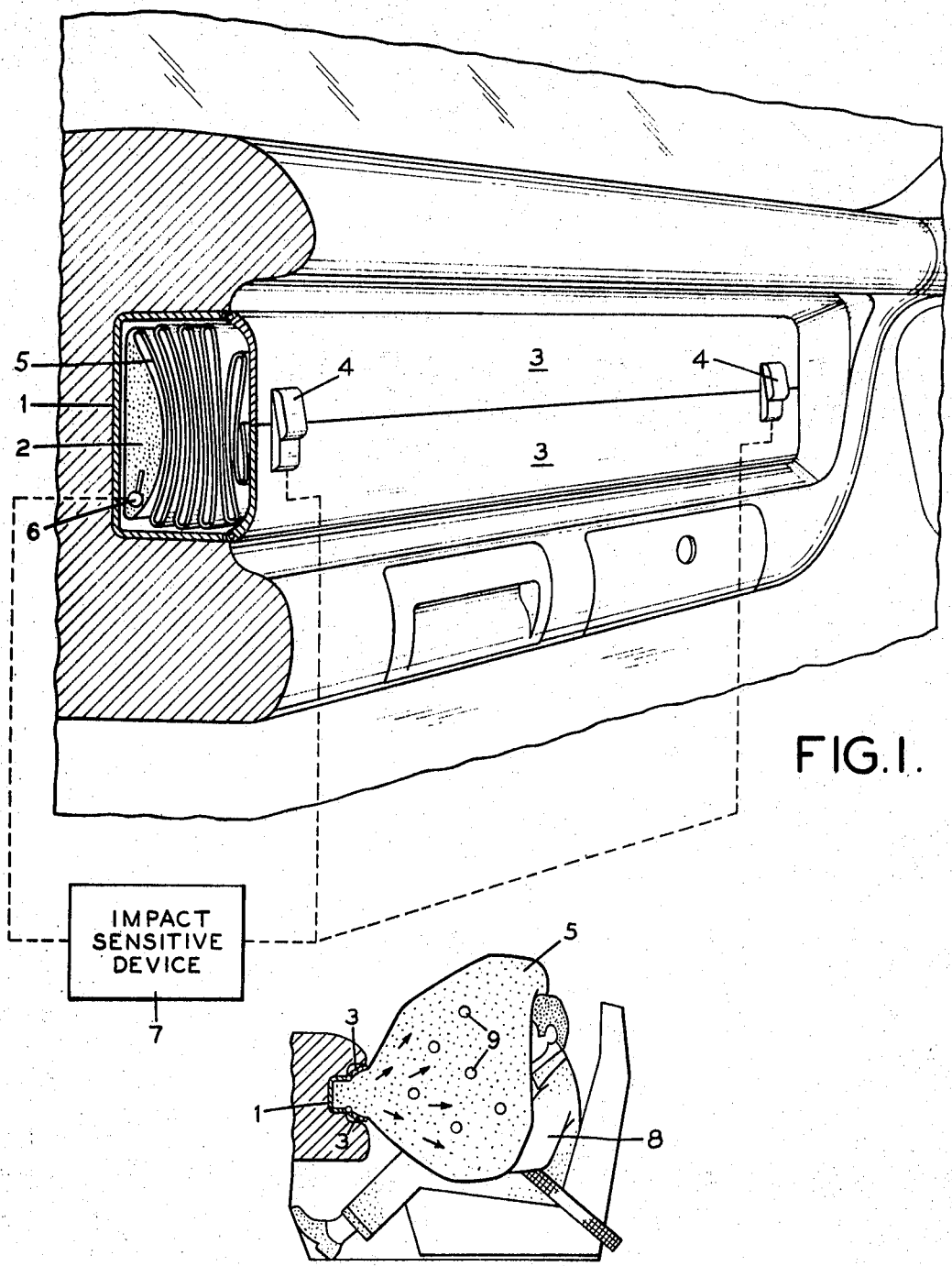
FIG. 1 is a perspective view of a deflated impact-absorbing bag within an enclosure in a vehicle.
FIG. 2 is a sectional view showing the impact-absorbing bag inflated and supporting a passenger in the normal seated position.

With reference to the drawings of one embodiment the present invention will be described in detail. Referring to FIG. 1 the preferred embodiment comprises a deflated impact-absorbing bag 5 preferably of a soft, flexible, tough, resilient material as for example, nylon (Capran) film. The material should be substantially tear resistant and capable of retaining its strength for extended periods in a folded condition within an enclosure 1 as illustrated in FIG. 1. A gas-producing medium 2 is located within the folded bag 5. The medium must be capable of remaining in a contained condition, as shown in FIG. 1, by the pressure created thereon by the folded bag and the closed enclosure 10, utilizing hinged enclosure covers 3, which are held closed by the impact-operated latches 4. The gas-producing medium 2 must be capable of spontaneously generating a gas to fill the deflated bag 5 when the latches 4 are released by a signal from an impact-sensitive device 7 and the hinged enclosure covers 3 are permitted to open. The gas-producing medium 2, may be a fluorinated hydrocarbon, such as Genetron 12. In the use of fluorinated hydrocarbon, the enclosure must be adequately sealed to store the hydrocarbon in its liquid form over a long period of time. The medium 2 must be capable of producing a gas when the hinged enclosure covers 3 are released, and it must be capable of being confined under the pressure created by the bag 5 and the pressure-resistant enclosure 1. In certain cases, where the time required to generate a gas into the bag is not sufficiently quick to expand the bag and cause it to be capable of absorbing the momentum of the passenger of a vehicle involved in a collision, a supplemental energy, or heat source 6 may be provided with the gas producing medium 2 as is shown in FIG. 1. Thus the additional energy source may decrease the time required for the gas-producing medium 2 to generate a gas sufficient to fill the bag. For example, it is known that the bag must expand to a size sufficient to absorb the momentum of a passenger or object in approximately 0.060 second at a 30 mile per hour barrier impact velocity. The additional energy source 6, which may for example, be a heat-generating device which is actuated by the same signal as the original signal used to release the hinged cover latches 4, will serve to reduce the time required to generate the gas required to fill the bag.

Also, it is significant that the material used to make the bag, such as nylon film of a thickness in the range of said 1 to 5 mils, be substantially resistant to permeability by the gas-producing medium 2 when it is in contact therewith over extended periods of time.

When a vehicle undergoes a collision causing a deceleration sufficient to cause physical harm to the passengers the impact-sensitive device 7 creates a signal which is transmitted to the enclosure cover latches 4 releasing them and permitting the enclosure covers to open. The signal may also be transmitted to the energy source 6 to activate it to generate an additional supply of energy for example in the form of heat, to decrease the time required by the gas producing medium 2 to generate a gas. When the hinged covers 3 are released and permitted to open, the pressure of the enclosure and bag on the gas producing medium 2 is released and the medium generates a gas into the bag 5, thereby expanding it. The bag which expands between the enclosure 1 and the passenger 8 as is shown in FIG. 2, may have valve ports 9 or holes for example, provided in the surface to increase the energy absorption qualities of the bag, since the holes will facilitate deflation of the bag.

The impact-sensitive device 7 must be programmed to detect vehicle decelerations of sufficient g which would otherwise cause injury to the passengers of the vehicle in the absence of the present invention.

It is apparent that many modifications and variations may be effected without departing from the scope of the appended claims.

The invention, therefore, is to be limited only as indicated by the scope of the appended claims.

What is claimed is:

1. In a safety device for vehicle passengers, the combination comprising:
   a. a flexible, resilient, deflated bag, said bag being capable of being fully expanded when filled with a gaseous medium;
   b. a pressure-resistant closed enclosure for said bag; and
   c. a noninflammable gas producing medium contained within the folded bag, said medium being capable of generating an expanding gas into said bag when the enclosure is opened, thus facilitating expansion of said bag.

2. The invention as described in claim 1 wherein the pressure resistant enclosure has covers thereon which may be opened.

3. The invention as described in claim 2 wherein the pressure-resistant enclosure is elongated and has a rectangular cross section.

4. The invention as described in claim 3 wherein the pressure-resistant enclosure covers are hinged, said covers being held closed during normal operation of the vehicle by releasable impact sensitive latches.

5. The invention as described in claim 4 wherein said impact-sensitive latches are released by a signal generated by at least one impact-sensitive device in the vehicle.

6. The invention as described in claim 5 wherein said bag is constructed of nylon film.

7. The invention as described in claim 6 wherein said bag is seamless.

8. The invention as described in claim 7 wherein the noninflammable gas generating medium is a fluorinated hydrocarbon.

9. The invention as described in claim 8 wherein said bag is of sufficient size to fill the space between said enclosure and the passenger when fully expanded to facilitate absorption of impact of the passenger.

10. The invention as described in claim 9 wherein said bag is provided with means on the surface to permit deflation to facilitate improved shock absorption capability of said bag.

11. The invention as described in claim 10 wherein said means to permit deflation comprises valve ports.

12. The invention as described in claim 5, further comprising heat-generating means within said enclosure, responsive to said signal for aiding in the generation of gas.

13. In a safety device for motor vehicle passengers, the combination comprising:
   a. a flexible, resilient, deflated bag of nylon film said bag having seamless construction;
   pressure-resistant a oressure-resistant enclosure for said bag;
   c. hinged covers for said pressure-resistant enclosure, said hinged covers being held closed by releasable impact-sensitive latches;
   d. at least one impact-sensitive device to provide a signal to release said latches;
   e. a noninflammable gas producing fluorinated hydrocarbon within the bag for generating a gaseous medium therein and expanding the bag when the hinged enclosure covers are released;
   f. an energy source activated by said impact-sensitive device when a signal is generated therein of sufficient magnitude to release said hinged cover latches; and
   g. heat-generating means within said enclosure responsive to said signal for aiding in the generation of gas from the fluorinated hydrocarbon.

* * * * *